(12) United States Patent
Zou

(10) Patent No.: US 10,528,824 B2
(45) Date of Patent: Jan. 7, 2020

(54) ARTIFICIAL NEURAL NETWORK FOR LANE FEATURE CLASSIFICATION AND LOCALIZATION

(71) Applicant: GM GLOBAL TECHNOLOGY OPERATIONS LLC, Detroit, MI (US)

(72) Inventor: Guangyu J. Zou, Warren, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 134 days.

(21) Appl. No.: 15/837,276

(22) Filed: Dec. 11, 2017

(65) Prior Publication Data

US 2019/0180115 A1   Jun. 13, 2019

(51) Int. Cl.
| | |
|---|---|
| G06K 9/00 | (2006.01) |
| G05D 1/02 | (2006.01) |
| G06N 3/08 | (2006.01) |
| B60W 30/12 | (2006.01) |
| G06K 9/62 | (2006.01) |
| G08G 1/16 | (2006.01) |

(52) U.S. Cl.
CPC ......... *G06K 9/00798* (2013.01); *B60W 30/12* (2013.01); *G05D 1/0221* (2013.01); *G06K 9/6217* (2013.01); *G06K 9/6289* (2013.01); *G06N 3/08* (2013.01); *G08G 1/167* (2013.01)

(58) Field of Classification Search
None
See application file for complete search history.

(56) References Cited

U.S. PATENT DOCUMENTS

| | | | | |
|---|---|---|---|---|
| 9,286,524 B1 * | 3/2016 | Mei | ..................... | G06K 9/6273 |
| 10,192,113 B1 * | 1/2019 | Liu | ................... | G06K 9/00664 |
| 2019/0163989 A1 * | 5/2019 | Guo | ................... | G06K 9/00798 |

* cited by examiner

*Primary Examiner* — Leon Viet Q Nguyen
(74) *Attorney, Agent, or Firm* — Lorenz & Kopf, LLP

(57) ABSTRACT

Systems and method are provided for controlling a vehicle. In one embodiment, a method of controlling a vehicle, includes receiving, via at least one processor, image data from each of plural cameras mounted on the vehicle. The method includes assembling, via the at least one processor, the image data from each of the plural cameras to form assembled image data. The method includes classifying and localizing lane features using an artificial neural network based on the assembled image data, to produce classified and localized lane data. The method includes performing, via the at least one processor, a data fusion process based on the classified and localized lane data, thereby producing fused lane feature data. The method includes controlling, via the at least one processor, the vehicle based, in part, on the fused lane feature data.

10 Claims, 10 Drawing Sheets

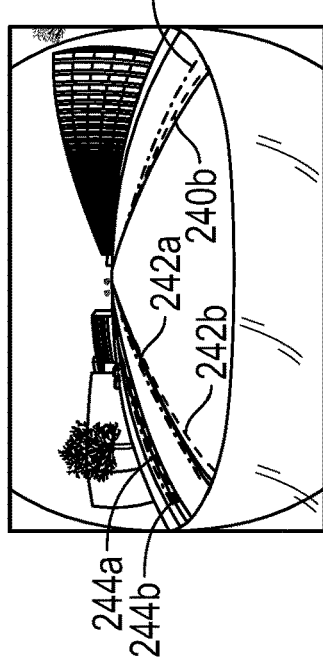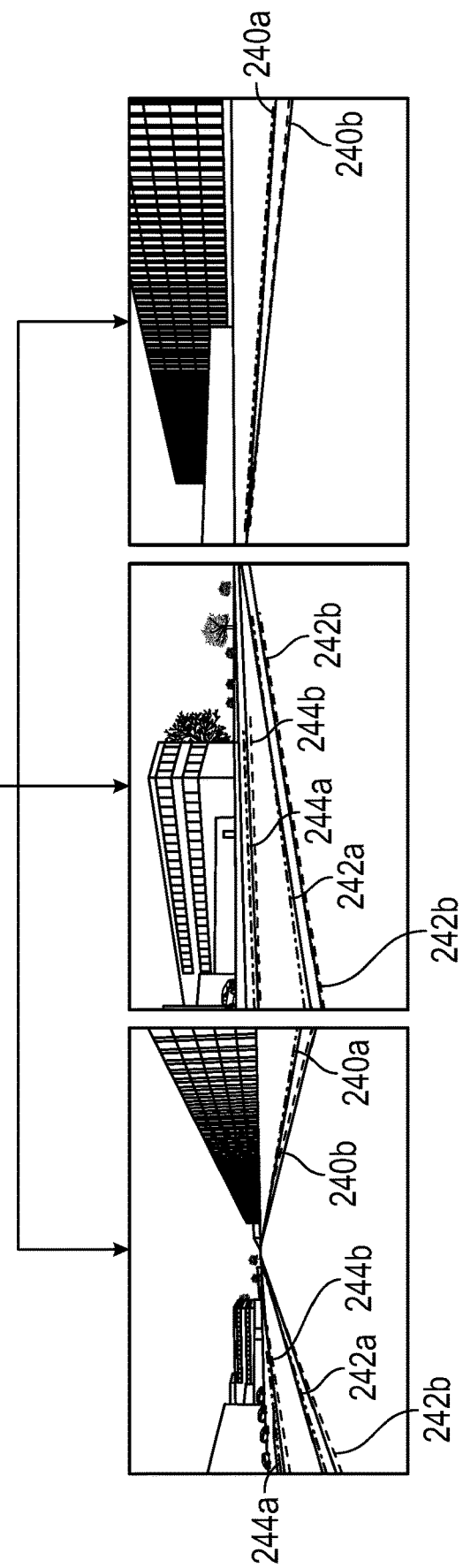

ARTIFICIAL NEURAL NETWORK FOR LANE FEATURE CLASSIFICATION AND LOCALIZATION

TECHNICAL FIELD

The present disclosure generally relates to vehicles, systems and methods using an artificial neural network for feature perception, and more particularly relates to vehicles, systems and methods including an artificial neural network for classifying and localizing lane features.

INTRODUCTION

Autonomous and semi-autonomous vehicles are capable of sensing their environment and navigating based on the sensed environment. Such vehicles sense their environment using sensing devices such as radar, lidar, image sensors, and the like. The vehicle system further uses information from global positioning systems (GPS) technology, navigation systems, vehicle-to-vehicle communication, vehicle-to-infrastructure technology, and/or drive-by-wire systems to navigate the vehicle.

Vehicle automation has been categorized into numerical levels ranging from Zero, corresponding to no automation with full human control, to Five, corresponding to full automation with no human control. Various automated driver-assistance systems, such as cruise control, adaptive cruise control, and parking assistance systems correspond to lower automation levels, while true "driverless" vehicles correspond to higher automation levels. Some automated vehicle systems classify and localize lane features such as curbs, road edges, lane markings and other road markings. Some vehicles including automated vehicle features have included a plurality of optical cameras to image an environment surrounding the vehicle.

Accordingly, it is desirable to provide systems and methods that classify and localize image features in a computationally efficient, and accurate, manner. It is further desirable to provide methods and systems that classify and localize image features from plural cameras, whilst maintaining computational efficiency. Furthermore, other desirable features and characteristics of the present invention will become apparent from the subsequent detailed description and the appended claims, taken in conjunction with the accompanying drawings and the foregoing technical field and background.

SUMMARY

Systems and methods are provided for classifying and localizing lane features.

In one embodiment, a method of controlling a vehicle includes receiving, via a processor, image data from each of plural cameras mounted on the vehicle. The method includes assembling, via the processor, the image data from each of the plural cameras to form assembled image data. The method includes classifying and localizing lane features using an artificial neural network based on the assembled image data, to produce classified and localized lane data. The method includes performing, via the processor, a data fusion process based on the classified and localized lane data, thereby producing fused lane feature data. The method includes controlling, via the processor, the vehicle based, in part, on the fused lane feature data.

In embodiments, the method includes performing, via the processor, an image space to real space transformation based on the classified and localized lane data to provide real space lane feature data. In embodiments, the image space to real space transformation is configured to receive image to real space calibration data for each of the plural cameras and uses the respective calibration data for each part of the classified and localized lane data corresponding to a given one of the plural cameras.

In embodiments, the transforming occurs before the fusing.

In embodiments, a plurality of the cameras has a different, but overlapping field of view and the fusion includes consolidating overlapping fields of view.

In embodiments, the classified and localized lane data defines line segments.

In embodiments, curve fitting is performed based on the line segments to produce the classified and localized lane curve data. In embodiments, data clustering is performed based on the line segments to produce clustered data and curve fitting is performed based on the clustered data.

In embodiments, the method includes defining, via the processor, anchor points along each of the line segments. In embodiments, the method includes executing a data clustering algorithm, via the processor, on the anchor points to produce clustered anchor points. In embodiments, the method includes curve fitting, via the processor, the clustered anchor points to produce classified and localized lane curve data.

In embodiments, the method includes performing, via the processor, an image space to real space transformation based on the classified and localized lane curve data to provide real space lane feature data and performing the data fusion process based on the real space lane feature data, thereby producing the fused lane feature data. In embodiments, the data fusion process is performed on data that has been obtained from the plural cameras.

In another embodiment, there is provided a system for localizing and classifying line-based features. The system includes a processor configured to receive image data from each of plural cameras. The processor is configured to assemble the image data from each of the plural cameras to form assembled image data. The system includes an artificial neural network configured to classify and localize image features based on the assembled image data to produce classified and localized line data. The processor is configured to perform a data fusion process based on the classified and localized line data, thereby producing fused line-based feature data.

Higher efficiency of the artificial neural network is possible through processing assembled data image data.

In embodiments, the artificial neural network is configured to classify and localize line based lane features. The line based lane features include lane markings, road markings, lane boundaries and/or road boundaries.

In embodiments, the system is a vehicle system and the processor is configured to control the vehicle based, in part, on the fused lane feature data.

In another embodiment, a method is provided for training an artificial neural network. The method includes receiving, via the artificial neural network, image data and feature labels, each feature label including a feature classification and a localized line (straight, curved or both). The method includes defining a region of interest between two lines positioned outside of boundaries of a feature of interest. The method includes operating the artificial neural network using the image data as an input layer to produce output classified and localized data including output classification and localization parameters. The method includes evaluating, via the artificial neural network, a cost function comparing output classification and localization parameters and corresponding nominal parameters defined within the region of interest, wherein the nominal parameters are defined based on the feature labels and serve as a learning target for the cost function. The method includes training the artificial neural network based on the cost function.

In embodiments, the nominal parameters include class probability, orthogonal offset and tangential orientation to the boundaries of the feature of interest, which are translated from feature labels. In embodiments, the nominal parameters In embodiments, the artificial neural network is a convolutional neural network.

In embodiments, the method includes producing, via a processor, augmented image data for training the artificial neural network by transforming the image data including associated feature labels using an image transformation effect.

In embodiments, the image transformation effect includes a change of perspective, scale, aspect ratio, etc.

In embodiments, the image transformation effect includes a selection from: change of lighting effect, change of weather effect, image noise effects, change of focus effect and white balance effects.

In embodiments, each feature label includes first and second localized lines, wherein the method includes extending, via a processor, the region of interest (ROI) outwards from the margin, delineated by the first and second lines; evaluating, via the artificial neural network, the cost function, the cost function comparing the output classification and localization parameters and corresponding nominal parameters defined within the ROI, serving as the learning target.

In embodiments, the output localization parameters include line segments. In embodiments, the output localization parameters include an angle of each line segment.

In embodiments, the method includes using the artificial neural network to determine lane features and controlling a vehicle based on the lane features.

In another embodiment, a system for training an artificial neural network is provided. The system includes an artificial neural network configured to receive image data including associated feature labels, each feature label including a feature classification and at least one localized line. A processor of the system is configured to define at least one margin in the form of at least one line positioned adjacent each at least one localized line. The artificial neural network is configured to use the image data as an input layer to produce output classified and localized data including output classification and localization parameters. The artificial neural network is configured to evaluating a cost function comparing output classification and localization parameters in a region of interest defined based on the at least one margin, wherein nominal classification and localization parameters within the region of interest serve as a learning target for the cost function. In embodiments, the artificial neural network is configured to adapt at least one layer thereof based on the evaluation of the cost function, thereby training the artificial neural network.

In another embodiment, a vehicle is provided. The vehicle includes a plurality of cameras providing image data, and a processor configured to: receive the image data from each of the cameras, assemble the image data from each of the plural cameras to form assembled image data, classify and localize lane features using an artificial neural network based on the assembled image data to produce classified and localized lane data, perform a data fusion process based on the classified and localized lane data thereby producing fused lane feature data, and control the vehicle based, in part, on the fused lane feature data.

In embodiments, the processor is configured to perform an image space to real space transformation based on the classified and localized lane data to provide real space lane feature data.

In embodiments, a plurality of the cameras has a different, but overlapping field of view and the fusion comprises consolidating overlapping fields of view.

In embodiments, the classified and localized lane data defines line segments. In embodiments, the processor is configured to curve fit the line segments to produce the classified and localized lane curve data. In embodiments, the processor is configured to cluster the line segments to produce clustered data and to curve fit the clustered data. In embodiments, the processor is configured to define anchor points along each of the line segments. In embodiments, the processor is configured to data cluster the anchor points to produce clustered anchor points. In embodiments, the processor is configured to curve fit the clustered anchor points to produce classified and localized lane curve data.

In embodiments, the processor is configured to perform an image space to real space transformation based on the classified and localized lane curve data to provide real space lane feature data and to perform the data fusion process based on the real space lane feature data, thereby producing the fused lane feature data

BRIEF DESCRIPTION OF THE DRAWINGS

The exemplary embodiments will hereinafter be described in conjunction with the following drawing figures, wherein like numerals denote like elements, and wherein:

FIGS. 7(A) to 7(D) illustrate augmentation of labelled images, in accordance with various embodiments;

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Figure 1:
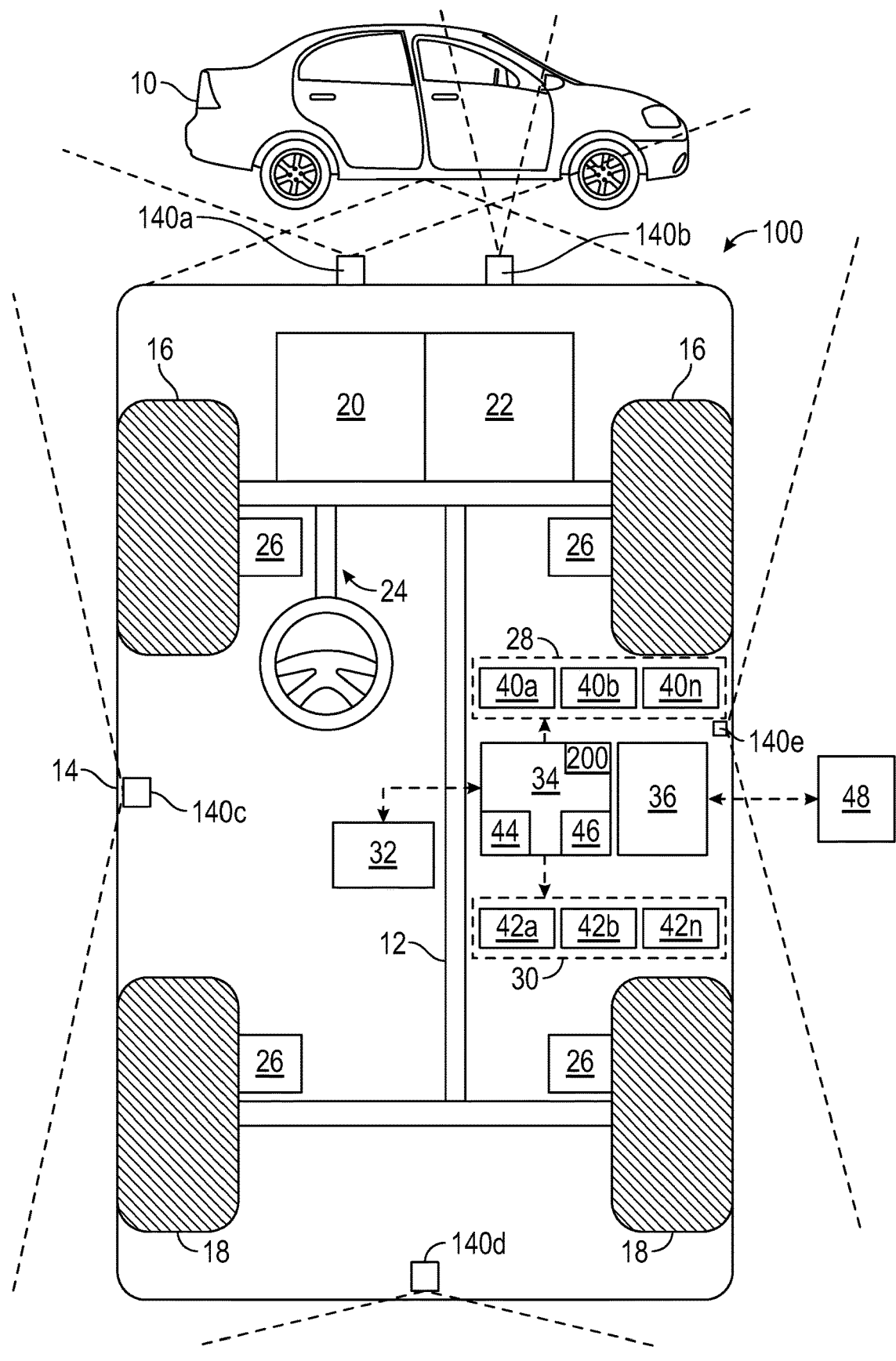
FIG. 1 is a functional block diagram illustrating an autonomous or semi-autonomous vehicle system having a classification and localization system, in accordance with various embodiments.

With reference to FIG. 1, a vehicle system shown generally at 100 is associated with a vehicle 10 in accordance with various embodiments. In general, the vehicle system 100 includes a classification and localization system 200 that classifies and localizes lane features for use by a driving system having an automated feature utilizing lane perception capabilities. The classification and localization system 200 described herein assembles multiple images, runs the assembled images through an artificial neural network for lane feature classification and localization, post processes the output layer and thereafter fuses the results.

The present description primarily describes use of the localization and classification system 200 in the context of classifying and localizing lane features for use in automotive applications. It should be understood, however, that the classification and localization system 200 can be used for classifying and localizing line based image features for other applications.

As depicted in FIG. 1, the vehicle 10 generally includes a chassis 12, a body 14, front wheels 16, and rear wheels 18. The body 14 is arranged on the chassis 12 and substantially encloses components of the vehicle 10. The body 14 and the chassis 12 may jointly form a frame. The wheels 16-18 are each rotationally coupled to the chassis 12 near a respective corner of the body 14.

In some embodiments, the vehicle 10 is an autonomous vehicle and the classification and localization system 200 is incorporated into the autonomous vehicle 10 (hereinafter referred to as the autonomous vehicle 10). The present description concentrates on an exemplary application in autonomous vehicle applications. It should be understood, however, that the classification and localization system 200 described herein is envisaged to be used in semi-autonomous automotive vehicles including driver assist systems that make use of lane perception information, such as lane departure warning systems and lane-keeping assistance systems.

The autonomous vehicle 10 is, for example, a vehicle that is automatically controlled to carry passengers from one location to another. The vehicle 10 is depicted in the illustrated embodiment as a passenger car, but it should be appreciated that any other vehicle including motorcycles, trucks, sport utility vehicles (SUVs), recreational vehicles (RVs), marine vessels, aircraft, etc., can also be used. In an exemplary embodiment, the autonomous vehicle 10 is a so-called Level Four or Level Five automation system. A Level Four system indicates "high automation", referring to the driving mode-specific performance by an automated driving system of all aspects of the dynamic driving task, even if a human driver does not respond appropriately to a request to intervene. A Level Five system indicates "full automation", referring to the full-time performance by an automated driving system of all aspects of the dynamic driving task under all roadway and environmental conditions that can be managed by a human driver.

As shown, the autonomous vehicle 10 generally includes a propulsion system 20, a transmission system 22, a steering system 24, a brake system 26, a sensor system 28, an actuator system 30, at least one data storage device 32, at least one controller 34, and a communication system 36. The propulsion system 20 may, in various embodiments, include an internal combustion engine, an electric machine such as a traction motor, and/or a fuel cell propulsion system. The transmission system 22 is configured to transmit power from the propulsion system 20 to the vehicle wheels 16-18 according to selectable speed ratios. According to various embodiments, the transmission system 22 may include a step-ratio automatic transmission, a continuously-variable transmission, or other appropriate transmission. The brake system 26 is configured to provide braking torque to the vehicle wheels 16-18. The brake system 26 may, in various embodiments, include friction brakes, brake by wire, a regenerative braking system such as an electric machine, and/or other appropriate braking systems. The steering system 24 influences a position of the of the vehicle wheels 16-18. While depicted as including a steering wheel for illustrative purposes, in some embodiments contemplated within the scope of the present disclosure, the steering system 24 may not include a steering wheel.

The sensor system 28 includes one or more sensing devices 40a-40n that sense observable conditions of the exterior environment and/or the interior environment of the autonomous vehicle 10. The sensing devices 40a-40n can include, but are not limited to, radars, lidars, global positioning systems, optical cameras 140a-140n, thermal cameras, ultrasonic sensors, and/or other sensors. The optical cameras 140a-140n are mounted on the vehicle 10 and are arranged for capturing images (e.g. a sequence of images in the form of a video) of an environment surrounding the vehicle 10. In the illustrated embodiment, there are two front cameras 140a, 140b arranged for respectively imaging a wide angle, near field of view and a narrow angle, far field of view. Further illustrated are left-side and right-side cameras 140c, 140e and a rear camera 140d. The number and position of the various cameras 140a-140n is merely exemplary and other arrangements are contemplated. In various embodiments, one or more of the cameras 140a-140n have an overlapping field of view with the field of view of one or more other cameras 140a-140n. The actuator system 30 includes one or more actuator devices 42a-42n that control one or more vehicle features such as, but not limited to, the propulsion system 20, the transmission system 22, the steering system 24, and the brake system 26. In various embodiments, the vehicle features can further include interior and/or exterior vehicle features such as, but are not limited to, doors, a trunk, and cabin features such as air, music, lighting, etc. (not numbered).

The data storage device 32 stores data for use in automatically controlling the autonomous vehicle 10. In various embodiments, the data storage device 32 stores defined maps of the navigable environment. In various embodiments, the defined maps may be predefined by and obtained from a remote system (described in further detail with regard to FIG. 2). For example, the defined maps may be assembled by the remote system and communicated to the autonomous vehicle 10 (wirelessly and/or in a wired manner) and stored in the data storage device 32. As can be appreciated, the data storage device 32 may be part of the controller 34, separate from the controller 34, or part of the controller 34 and part of a separate system.

The controller 34 includes at least one processor 44 and a computer readable storage device or media 46. The processor 44 can be any custom made or commercially available processor, a central processing unit (CPU), a graphics processing unit (GPU), an auxiliary processor among several processors associated with the controller 34, a semiconductor based microprocessor (in the form of a microchip or chip set), a macroprocessor, any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the autonomous vehicle 10.

The instructions may include one or more separate programs, each of which comprises an ordered listing of executable instructions for implementing logical functions. The instructions, when executed by the processor 44, receive and process signals from the sensor system 28, perform logic, calculations, methods and/or algorithms for automatically controlling the components of the autonomous vehicle 10, and generate control signals to the actuator system 30 to automatically control the components of the autonomous vehicle 10 based on the logic, calculations, methods, and/or algorithms. Although only one controller 34 is shown in FIG. 1, embodiments of the autonomous vehicle 10 can include any number of controllers 34 that communicate over any suitable communication medium or a combination of communication mediums and that cooperate to process the sensor signals, perform logic, calculations, methods, and/or algorithms, and generate control signals to automatically control features of the autonomous vehicle 10.

In various embodiments, one or more instructions of the controller 34 are embodied in the classification and localization system 200 and, when executed by the processor 44, are configured to assemble images from plural cameras 140a-140n, run the images through a single artificial neural network, obtain classification and localization parameters for each of the images, and fuse the images to obtain fused classified and localized data in real world coordinates. The fused data is used in a driving system having one or more automated features.

Figure 2:
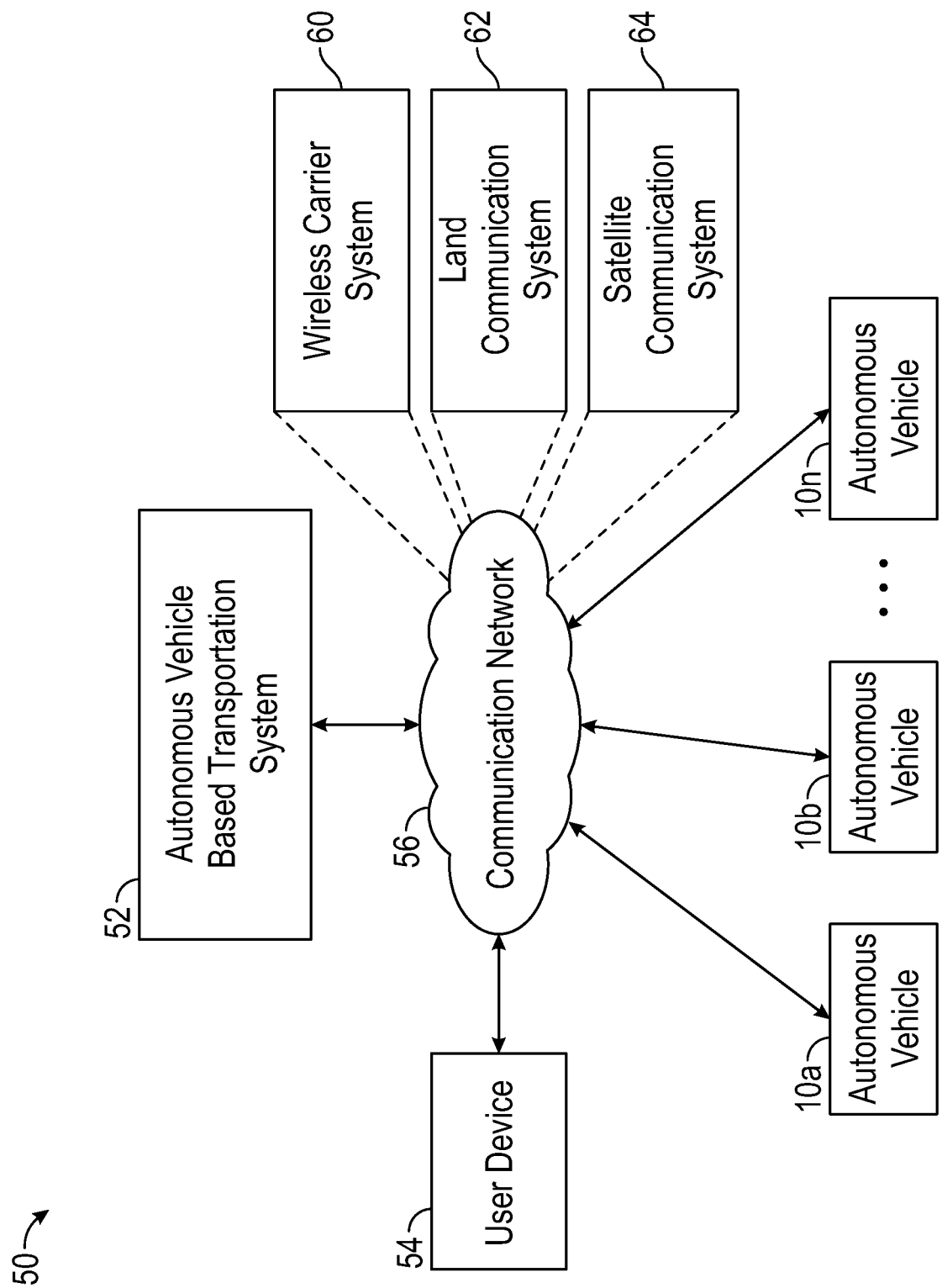
FIG. 2 is a functional block diagram illustrating a transportation system having one or more autonomous vehicles of FIG. 1, in accordance with various embodiments.

The communication system 36 is configured to wirelessly communicate information to and from other entities 48, such as but not limited to, other vehicles ("V2V" communication,) infrastructure ("V2I" communication), remote systems, and/or personal devices (described in more detail with regard to FIG. 2). In an exemplary embodiment, the communication system 36 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

With reference now to FIG. 2, in various embodiments, the autonomous vehicle 10 described with regard to FIG. 1 may be suitable for use in the context of a taxi or shuttle system in a certain geographical area (e.g., a city, a school or business campus, a shopping center, an amusement park, an event center, or the like) or may simply be managed by a remote system. For example, the autonomous vehicle 10 may be associated with an autonomous vehicle based remote transportation system. FIG. 2 illustrates an exemplary embodiment of an operating environment shown generally at 50 that includes an autonomous vehicle based remote transportation system 52 that is associated with one or more autonomous vehicles 10a-10n as described with regard to FIG. 1. In various embodiments, the operating environment 50 further includes one or more user devices 54 that communicate with the autonomous vehicle 10 and/or the remote transportation system 52 via a communication network 56.

The communication network 56 supports communication as needed between devices, systems, and components supported by the operating environment 50 (e.g., via tangible communication links and/or wireless communication links). For example, the communication network 56 can include a wireless carrier system 60 such as a cellular telephone system that includes a plurality of cell towers (not shown), one or more mobile switching centers (MSCs) (not shown), as well as any other networking components required to connect the wireless carrier system 60 with a land communications system. Each cell tower includes sending and receiving antennas and a base station, with the base stations from different cell towers being connected to the MSC either directly or via intermediary equipment such as a base station controller. The wireless carrier system 60 can implement any suitable communications technology, including for example, digital technologies such as CDMA (e.g., CDMA2000), LTE (e.g., 4G LTE or 5G LTE), GSM/GPRS, or other current or emerging wireless technologies. Other cell tower/base station/MSC arrangements are possible and could be used with the wireless carrier system 60. For example, the base station and cell tower could be co-located at the same site or they could be remotely located from one another, each base station could be responsible for a single cell tower or a single base station could service various cell towers, or various base stations could be coupled to a single MSC, to name but a few of the possible arrangements.

Apart from including the wireless carrier system 60, a second wireless carrier system in the form of a satellite communication system 64 can be included to provide uni-directional or bi-directional communication with the autonomous vehicles 10a-10n. This can be done using one or more communication satellites (not shown) and an uplink transmitting station (not shown). Uni-directional communication can include, for example, satellite radio services, wherein programming content (news, music, etc.) is received by the transmitting station, packaged for upload, and then sent to the satellite, which broadcasts the programming to subscribers. Bi-directional communication can include, for example, satellite telephony services using the satellite to relay telephone communications between the vehicle 10 and the station. The satellite telephony can be utilized either in addition to or in lieu of the wireless carrier system 60.

A land communication system 62 may further be included that is a conventional land-based telecommunications network connected to one or more landline telephones and connects the wireless carrier system 60 to the remote transportation system 52. For example, the land communication system 62 may include a public switched telephone network (PSTN) such as that used to provide hardwired telephony, packet-switched data communications, and the Internet infrastructure. One or more segments of the land communication system 62 can be implemented through the use of a standard wired network, a fiber or other optical network, a cable network, power lines, other wireless networks such as wireless local area networks (WLANs), or networks providing broadband wireless access (BWA), or any combination thereof. Furthermore, the remote transportation system 52 need not be connected via the land communication system 62, but can include wireless telephony equipment so that it can communicate directly with a wireless network, such as the wireless carrier system 60.

Although only one user device 54 is shown in FIG. 2, embodiments of the operating environment 50 can support any number of user devices 54, including multiple user devices 54 owned, operated, or otherwise used by one person. Each user device 54 supported by the operating environment 50 may be implemented using any suitable hardware platform. In this regard, the user device 54 can be realized in any common form factor including, but not limited to: a desktop computer; a mobile computer (e.g., a tablet computer, a laptop computer, or a netbook computer); a smartphone; a video game device; a digital media player; a piece of home entertainment equipment; a digital camera or video camera; a wearable computing device (e.g., smart watch, smart glasses, smart clothing); or the like. Each user device 54 supported by the operating environment 50 is realized as a computer-implemented or computer-based device having the hardware, software, firmware, and/or processing logic needed to carry out the various techniques and methodologies described herein. For example, the user device 54 includes a microprocessor in the form of a programmable device that includes one or more instructions stored in an internal memory structure and applied to receive binary input to create binary output. In some embodiments, the user device 54 includes a GPS module capable of receiving GPS satellite signals and generating GPS coordinates based on those signals. In other embodiments, the user device 54 includes cellular communications functionality such that the device carries out voice and/or data communications over the communication network 56 using one or more cellular communications protocols, as are discussed herein. In various embodiments, the user device 54 includes a visual display, such as a touch-screen graphical display, or other display.

The remote transportation system 52 includes one or more backend server systems, which may be cloud-based, network-based, or resident at the particular campus or geographical location serviced by the remote transportation system 52. The remote transportation system 52 can be manned by a live advisor, or an automated advisor, or a combination of both. The remote transportation system 52 can communicate with the user devices 54 and the autonomous vehicles 10a-10n to schedule rides, dispatch autonomous vehicles 10a-10n, and the like. In various embodiments, the remote transportation system 52 stores store account information such as subscriber authentication information, vehicle identifiers, profile records, behavioral patterns, and other pertinent subscriber information.

In accordance with a typical use case workflow, a registered user of the remote transportation system 52 can create a ride request via the user device 54. The ride request will typically indicate the passenger's desired pickup location (or current GPS location), the desired destination location (which may identify a predefined vehicle stop and/or a user-specified passenger destination), and a pickup time. The remote transportation system 52 receives the ride request, processes the request, and dispatches a selected one of the autonomous vehicles 10a-10n (when and if one is available) to pick up the passenger at the designated pickup location and at the appropriate time. The transportation system 52 can also generate and send a suitably configured confirmation message or notification to the user device 54, to let the passenger know that a vehicle is on the way.

As can be appreciated, the subject matter disclosed herein provides certain enhanced features and functionality to what may be considered as a standard or baseline autonomous vehicle 10 and/or an autonomous vehicle based remote transportation system 52. To this end, an autonomous vehicle and autonomous vehicle based remote transportation system can be modified, enhanced, or otherwise supplemented to provide the additional features described in more detail below. The subject matter described herein concerning the classification and localization system 200 is not just applicable to autonomous driving applications, but also other driving systems having one or more automated features utilizing lane classification and localization features. Further, the classification and localization system 200 is operable in other applications than the automotive sphere for classifying and localizing line based image features.

Figure 3:
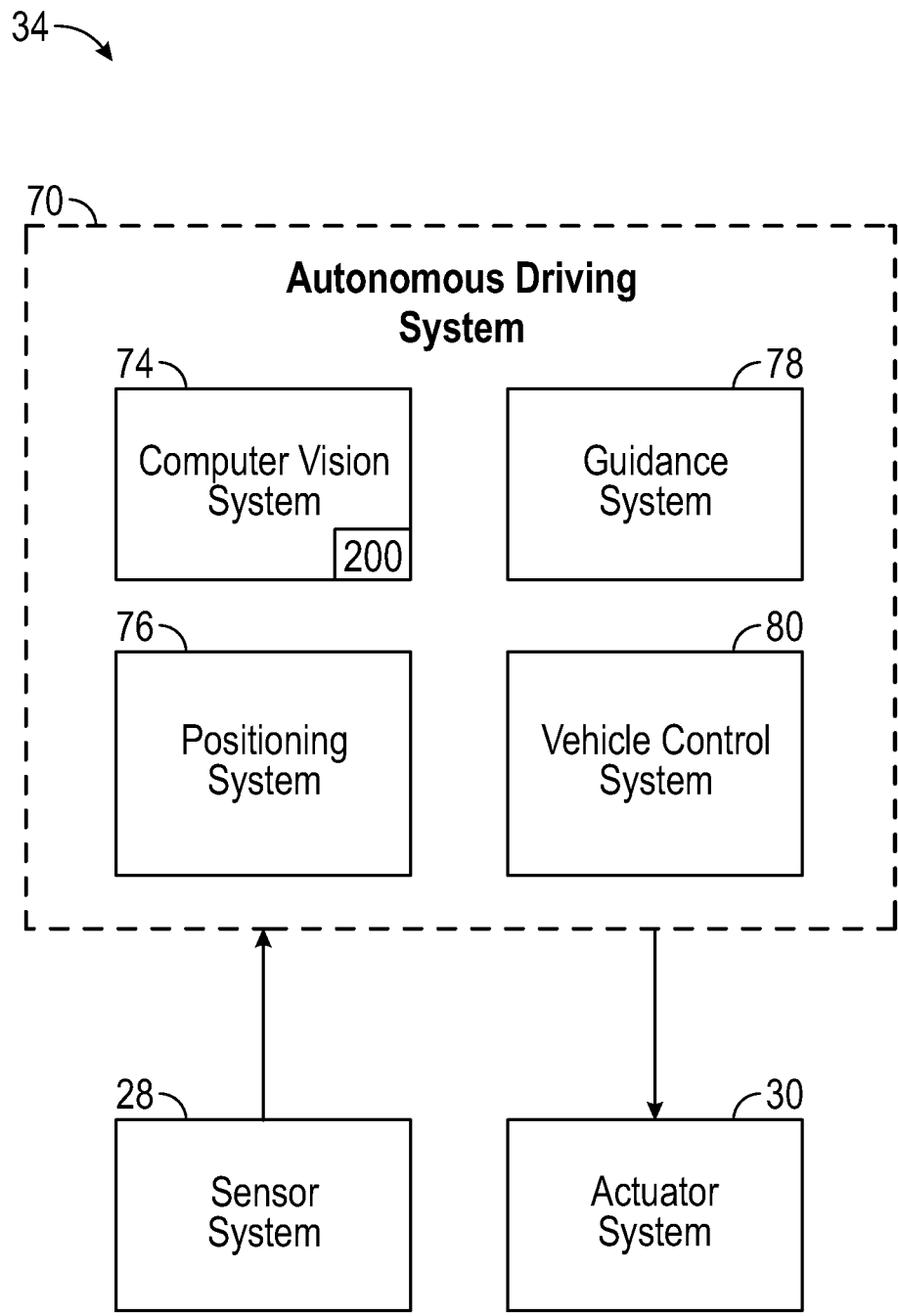
FIG. 3 is a dataflow diagram illustrating an autonomous driving system that includes a classification and localization system, in accordance with various embodiments.

In accordance with an exemplary autonomous driving application, the controller 34 implements an autonomous driving system (ADS) 70 as shown in FIG. 3. That is, suitable software and/or hardware components of the controller 34 (e.g., the processor 44 and the computer-readable storage device 46) are utilized to provide an autonomous driving system 70 that is used in conjunction with vehicle 10.

In various embodiments, the instructions of the autonomous driving system 70 may be organized by function, module, or system. For example, as shown in FIG. 3, the autonomous driving system 70 can include a computer vision system 74, a positioning system 76, a guidance system 78, and a vehicle control system 80. As can be appreciated, in various embodiments, the instructions may be organized into any number of systems (e.g., combined, further partitioned, etc.) as the disclosure is not limited to the present examples.

In various embodiments, the computer vision system 74 synthesizes and processes sensor data and predicts the presence, location, classification, and/or path of objects and features of the environment of the vehicle 10. In various embodiments, the computer vision system 74 can incorporate information from multiple sensors, including but not limited to cameras, lidars, radars, and/or any number of other types of sensors.

The positioning system 76 processes sensor data along with other data to determine a position (e.g., a local position relative to a map, an exact position relative to lane of a road, vehicle heading, velocity, etc.) of the vehicle 10 relative to the environment. The guidance system 78 processes sensor data along with other data to determine a path for the vehicle 10 to follow. The vehicle control system 80 generates control signals for controlling the vehicle 10 according to the determined path.

In various embodiments, the controller 34 implements machine learning techniques to assist the functionality of the controller 34, such as feature detection/classification, obstruction mitigation, route traversal, mapping, sensor integration, ground-truth determination, and the like.

As mentioned briefly above, the classification and localization system 200 of FIG. 1 (and FIG. 4) is included within the ADS 70 in autonomous driving applications, for example, as part of computer vision system 200. The autonomous driving system 200 is configured to determine lane feature data including lane feature classifications and lane feature localizations. Such lane feature data is utilizable by the guidance system 78 that takes into account lane boundaries, road boundaries and other classified road markings (e.g. stop lines and parking lines) to determine upon a trajectory for the vehicle 10. The vehicle control system 80 works with actuator system 80 to traverse such a trajectory.

Figure 4:
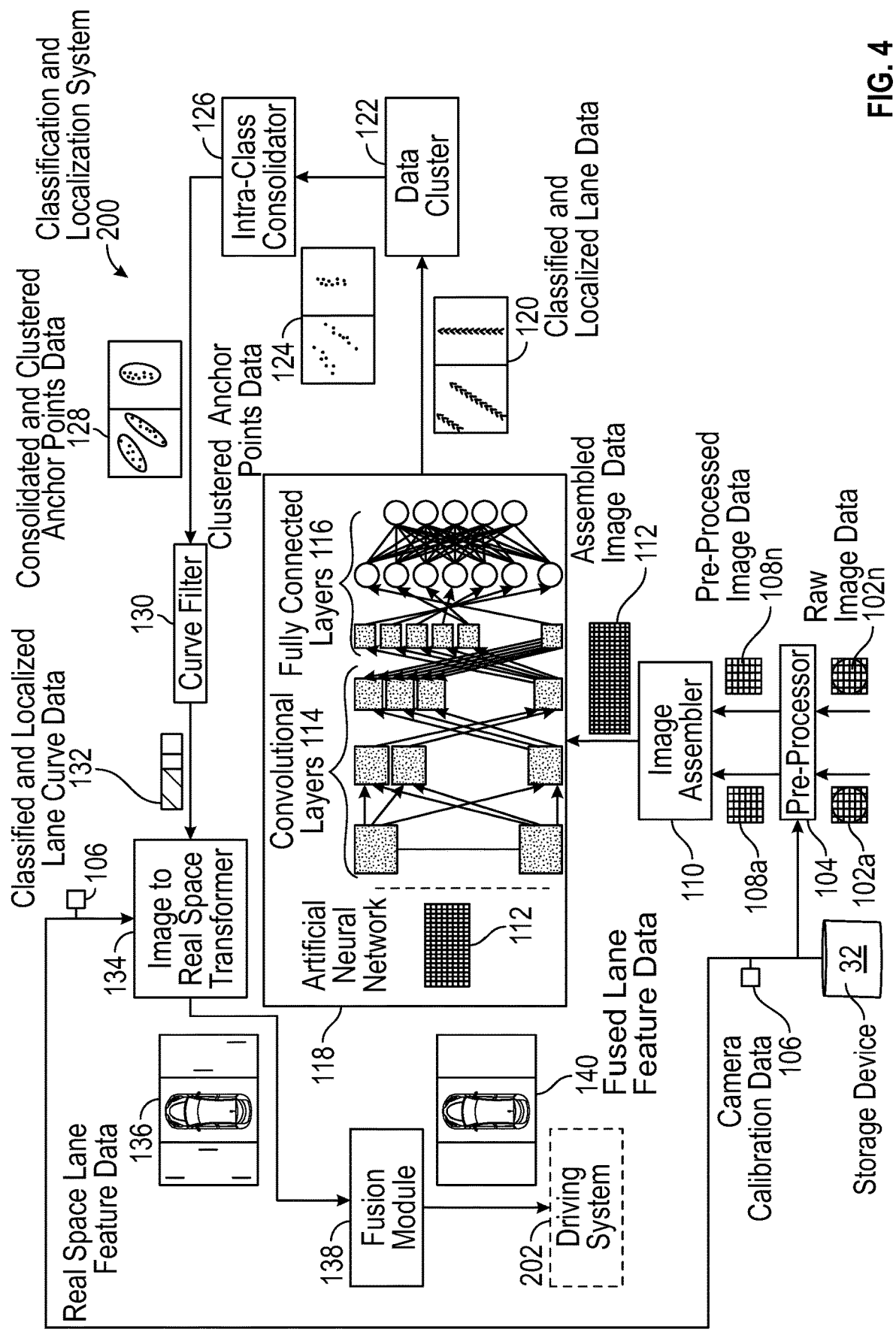
FIG. 4 is a dataflow diagram illustrating a classification and localization system, in accordance with various embodiments.

For example, as shown in more detail with regard to FIG. 4 and with continued reference to FIG. 3, the classification and localization system 200 includes an image assembler 110 for receiving and assembling images in the form of image data 108a to 108n from cameras 140a to 140n, an artificial neural network 118 for classifying and localizing assembled images in the form of assembled image data 112 and various post-processing modules for attaining fused lane feature data 140 for use by a driving system 202 such as a driving assist system or the autonomous driving system 200 described with respect to FIG. 3.

In more detail, and in accordance with embodiments, the classification and localization system 200 includes a pre-processor 104. The pre-processor 104 is configured to receive raw image data 102a to 102n representing images obtained from respective cameras 140a to 140n, the cameras being mounted on a vehicle 10 (which can be autonomous or semi-autonomous) in automotive applications. The cameras 140a to 140n generally produce an array of pixel values making up the raw image data 102a to 102n. The pre-processor 104 is configured to remove image artefacts such as distortion. To do so, the pre-processor 104 is configured to receive camera calibration data 106 from storage device 32. The pre-processor 104 is configured to run a distortion removal process, and optionally other image rectification processes, using the calibration data 106. The pre-processor 104 is configured to output respective pre-processed image data 108a to 108n corresponding to raw image data 102a to 102n in image rectified form.

The classification and localization system 200 includes an image assembler 110 configured to assemble the pre-processed image data 108a to 108n. In various embodiments, the assembly process involves concatenating, or otherwise putting together, each array of pre-processed image data 108a to 108n. The pre-processed image data 108a to 108n is assembled so as to preserve each set of pre-processed image data 108a to 108n in the assembled image data 112. In one example, each array of pre-processed image data 108a to 108n is assembled in a row direction. In another example, each array of pre-processed image data 108a to 108n is assembled in a column direction. In another example, the arrays of pre-processed image data 108a to 108n are put together in a two-dimensional arrangement extending in both column and row directions. In various embodiments, filler rows and/or columns are used where size differences exist in the input arrays of pre-processed image data 108a to 108n. The image assembler 110 is configured to construct a single array of assembled image data 112 from the plural incoming arrays of pre-processed image data 108a to 108n. The dimensions of the assembled image data 112 in terms of rows and columns of pixels is, in embodiments, pre-set by the image assembler 110. In embodiments, the assembled image data 112 includes plural images taken from different perspectives with different cameras 140a to 140e.

Figure 5A:
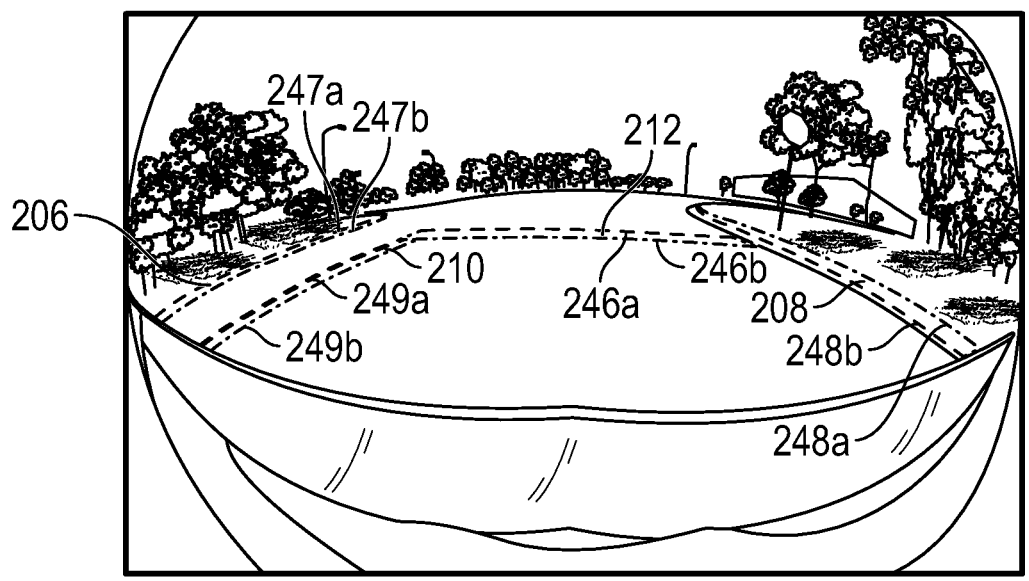
FIGS. 5(A) and 5(B) are exemplary images from different vehicle cameras, in accordance with various embodiments.
Figure 5B:
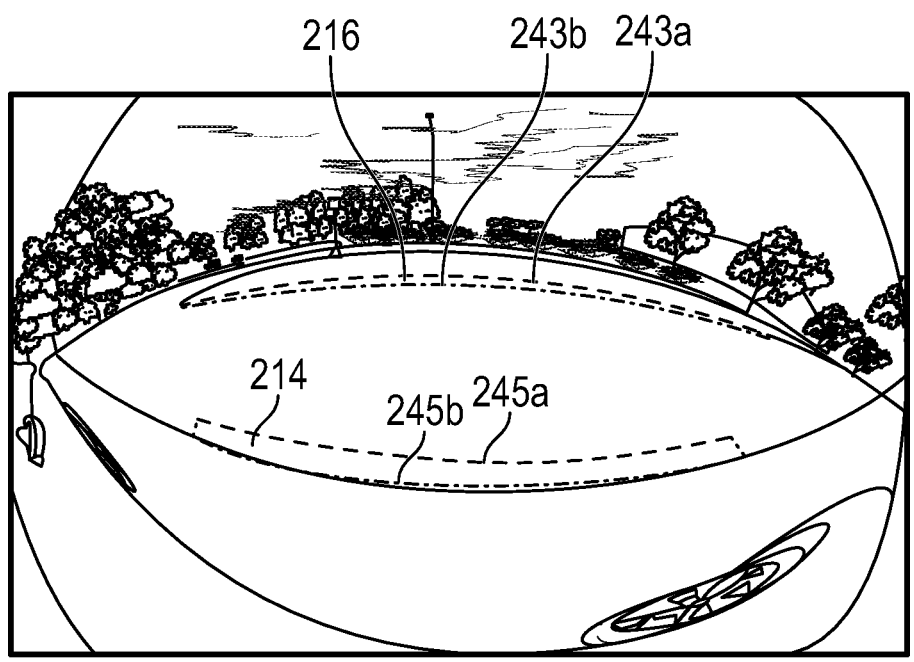

Referring briefly to FIGS. 5(a) and 5(b), there are respectively shown raw images from forward surround view camera, such as camera 140a, and left surround view camera, such as camera 140c. The image from forward surround view camera 140a reveals lane markings including a stop bar 212 and double yellow lines 210. The image from forward surround camera 140a also reveals lane features including first and second curbs 206, 208. The image from left surround view camera reveals a white dashed line 214 and a curb 216. The classification and localization system 200 as described herein provides an architecture making use of a single artificial neural network 118 for classifying and localizing such lane features in parallel.

The classification and localization system 200 includes an artificial neural network 118 that is configured to classify and localize lane features in the assembled image data 112 to produce classified and localized lane data 120. By operating on assembled image data 112, lane feature classification and localization is performed, in parallel, on images from plural different vehicle cameras 140a to 140e each having different environmental perspectives. In various embodiments, the artificial neural network 118 is a deep neural network architecture that uses a single artificial neural network 118 to recognize lane features in images from multiple vehicle cameras 140a to 140e. The artificial neural network 118 is configured to support dense multi-class lane boundary (e.g. curbs, road edges, lane markings) classification and localization. In one example, the artificial neural network 118 is an image-based, forward inference, deep neural network such as a convolutional neural network.

Figure 6:
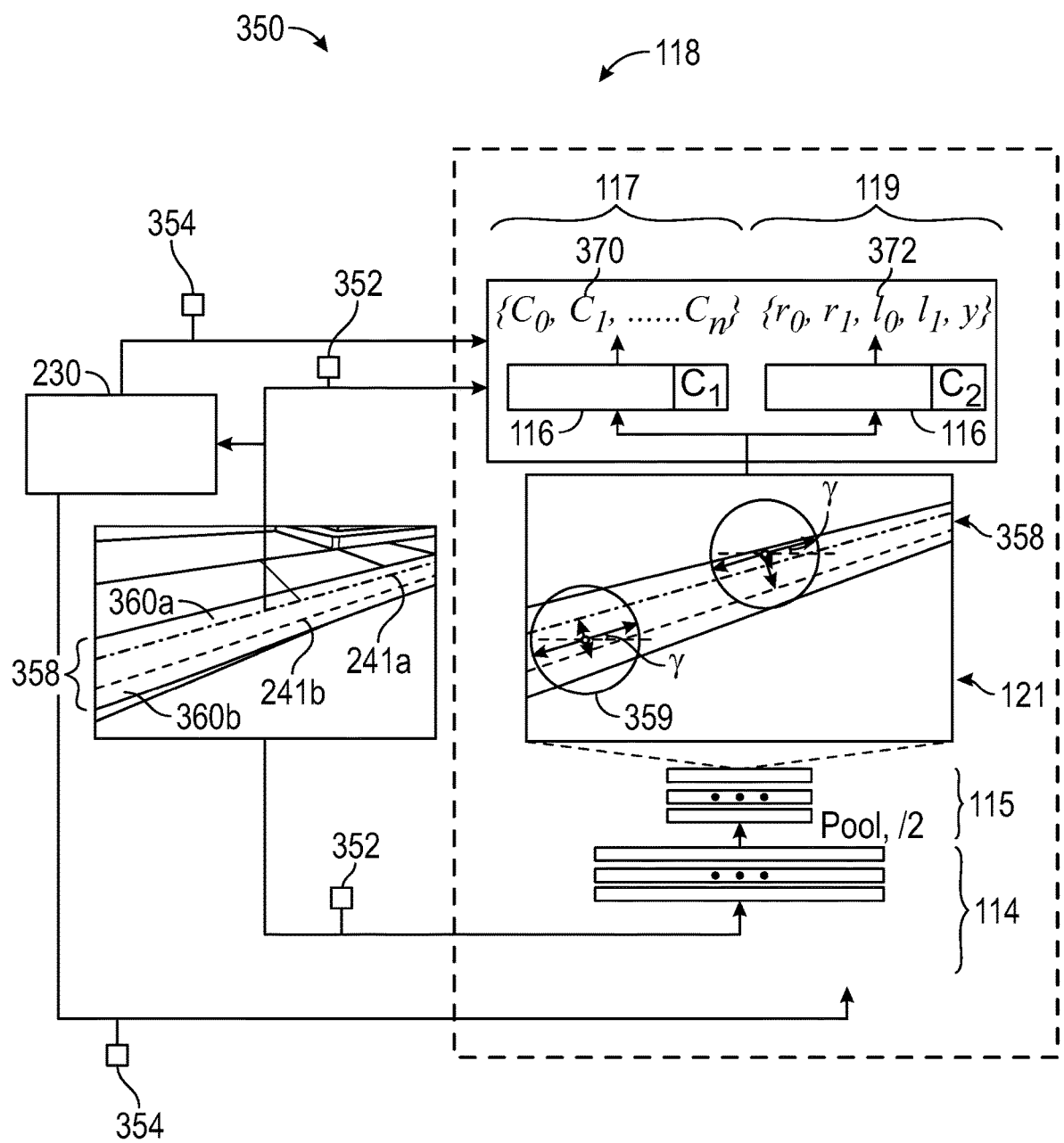
FIG. 6 is a schematic diagram of an artificial neural network for classifying and localizing image features, and data flows of a training system associated therewith, in accordance with various embodiments.

Referring to FIG. 6, with continued reference to FIG. 4, an example architecture for the artificial neural network 118 is illustrated. The artificial neural network includes convolutional layers 114, pool layers 115 and fully connected layers 116. The fully connected layers 116 are, in embodiments, divided into detection network 117 and regression network 119 branches. In the example, the convolutional and pool layers 114, 115 run the assembled image data 112 to produce feature maps 121. The feature maps 121 are sent both to the detection network 117 and the regression network 119. The detection network 117 and the localization network 119 include detection and regression cost functions $C_1$, $C_2$, respectively. Optionally, detection and regression cost functions $C_1$, $C_2$ can be combined into one overall cost function $C_3$.

In embodiments, the detection network 117 is configured to, based on the feature maps, output lane feature classifications $\{c_0, c_1, \ldots, c_n\}$ 370 representing various possible lane features. The various possible lane features include lane boundary markings (e.g. white dash markings, white solid markings, yellow dash markings, single yellow solid markings, double yellow markings, etc.), other road markings (e.g. stop lines, car pool lanes, etc.) or lane features (e.g. curbs, barriers, etc.). The lane feature classifications produced by the detection network 117 generally relate to line based features, e.g. curved or straight (or both) line based lane features.

Figure 8:
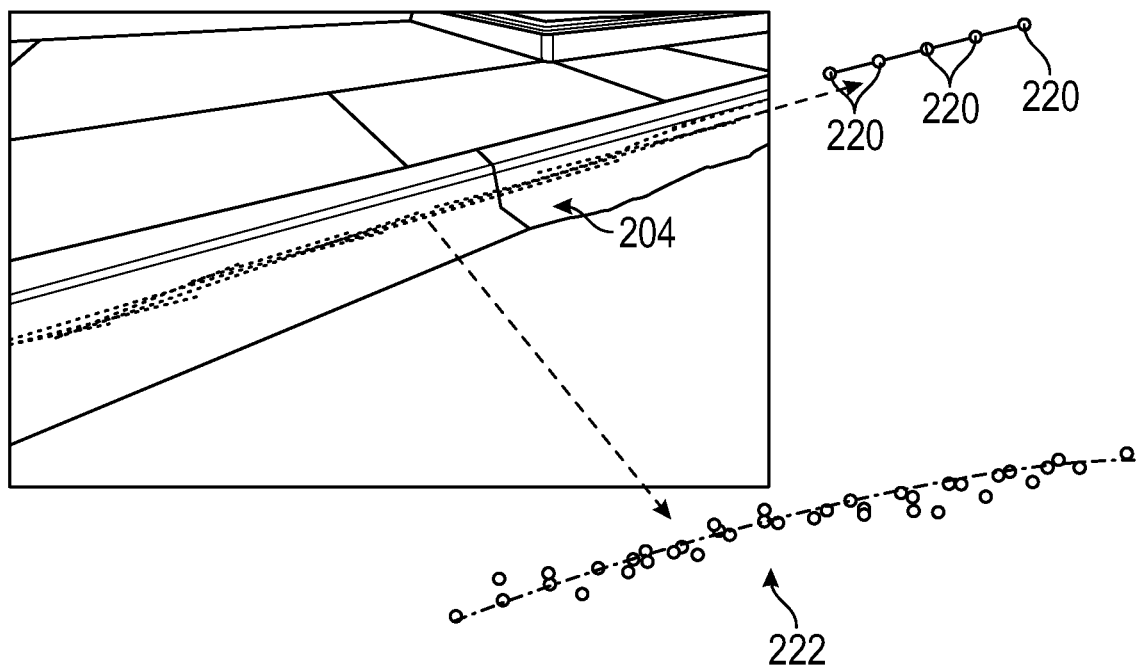
FIG. 8 schematically illustrates data clustering and curve fitting processes performed on line segments output from an artificial neural network, in accordance with various embodiments.

In embodiments, the regression network 119 is configured to produce, based on the feature maps 121, localization parameters $\{r_0, r_1, l_0, l_1, \gamma\}$ 372 representing spatial location of lane features in image space. With reference to FIG. 8, the regression network 119 is, in some embodiments, configured to produce localization parameters 372 representative of line segments 204. In examples, the regression network generates localization parameters including a first line segment 204, representing part of an outer boundary of a lane feature of interest; and a second line segment 204, representing part of an inner boundary of the lane feature of interest. The architecture of the neural network 118, particularly the pool layers 115, results in cells 359 being defined by the feature map. The first and second line segments 204 are constrained by a receptive field of a current cell 359 on the feature map 121. Output localization parameters 372 ($r_0$, $l_0$) denote an offset from a center of a receptive field of a cell on the feature map 121 to the closest point on a corresponding outer boundary of the feature of interest. Output localization parameters 372 ($r_1$, $l_1$) denote an offset from the same center to a corresponding inner boundary, and, $\gamma$ denotes the angle relative to a reference axis. Such localization parameters 372 thus represent first and second line segments forming part of inner and outer boundaries of a feature of interest. Based on the dimensions, e.g. diameter, of the cell 359, the localization parameters are convertible to first and second line segments. The localization parameters 372 are provided in the form of two-dimensional image space coordinates, in embodiments.

In embodiments, the artificial neural network 118 is configured to output classified and localized lane data 120 including lane feature classification parameters $\{c_0, c_1, \ldots, c_n\}$ 370 identifying various curved (i.e. line based) lane features and localization parameters $\{r_0, r_1, l_0, l_1, \gamma\}$ 372 defining location of lane features (e.g. in the form of many line segments 202). The classification and localization system 200 includes post processing modules (including data clusterer 122, intra-class consolidator 126 and curve fitter 130, in some embodiments) for merging a population of line segments 204 included in the classified and localized lane data 120 into coherent lane curve data.

In some embodiments, and with additional reference to FIG. 8, the data clusterer 122 is configured to convert each line segment 204 into a group of anchor points 220 positioned along a given line segment 204. In the example of FIG. 8, each line segment 204 is converted into five anchor points 220 extending linearly between start and endpoints of each line segment. Greater or lesser number of anchor points 220 than five could be selected. The data clusterer 122 is configured to cluster the anchor points 220 using a data clustering algorithm. Many data clustering algorithms are available for grouping the anchor points 220. The anchor points 220 are clustered based on classification and spatial proximity, both of which are known from classification and localization results included in the classified and localized lane data 120. The data clustering algorithm additionally serves to remove noise and outlier anchor points. In some embodiments, a density based data clustering algorithm is used such as density-based spatial clustering of applications with noise (DBSCAN). The data clusterer 122 produces clustered anchor points data 124. For any given lane feature or lane entity, such as a road marking, more than one cluster may exist in the clustered anchor points data 124.

In various embodiments, the intra-class consolidator 126 is configured to combine clusters belonging to the same lane entity of the same class. A lane entity is a single, separately identifiable lane feature of a particular class. In any given image, plural lane entities in one lane feature class may exist. For example, where there are two double yellow lines on opposite sides of a lane, each double yellow line belongs to the same class, but are different entities. As such, the double yellow lines are separately consolidated by the intra-class consolidator 126 to ensure that two lane entities are identified, as appropriate. Where there is more than one cluster for same lane entity, these clusters are brought together. The intra-class consolidator 126 is configured to implement logic that takes into account various cues such as closeness of clusters and orientation of clusters as an indication that two or multiple clusters should be combined into a single cluster corresponding to the same lane entity. The data clusterer 126 is configured to output consolidated and clustered anchor points data 128.

In embodiments, the curve fitter 130 is configured to perform a curve fitting algorithm for each consolidated cluster of anchor points 220 belonging to the same lane entity in the consolidated and clustered anchor points data 128. Various curve fitting algorithms could be used such as polynomial regression and spline fitting. One exemplary curve fitting algorithm is Bezier curve fitting. FIG. 8 illustrates an example curve 222 fitted to clustered anchor points 220 belonging to the same entity. The curve fitter 130 outputs classified and localized lane curve data 132 defining each identified lane entity, a localized curve for each lane entity and an associated classification identifier and lane entity identifier. For example, where there are double yellow lines on each side of a road that have been identified, the classified and localized lane curve data 132 includes curve localization data, classification (i.e. double yellow line) and a lane entity identifier (e.g. double yellow line 1, double yellow line 2).

The classified and localized lane curve data 132 includes curve localization data in image space. Also, since the artificial neural network 118 operated on assembled images included in assembled image data 112, the images, and the resulting classified and localized curves, are not arranged in order. There may also be some overlap in the images where the cameras 140a to 140e have overlapping fields of view. In order to arrange the lane features into real word space with any overlap consolidated, transformation and fusion processes are implemented via an image to real space transformer 134 and a fusion module 138.

In various embodiments, the image to real space transformer 106 is configured to receive camera calibration parameters 106 for each of the cameras 140a to 140n from storage device 32 and to arrange respective parts of the classified and localized lane curve data 132 into a common real-world reference frame relative to the vehicle 10. In this way, the assembled data from each camera is disassembled and arranged, as a precursor to a fusion process. Each camera 140*a* to 140*n*, generally, images a different perspective of the environment and has, in some examples, different sizes of fields of view. As such, each camera 140*a* to 140*n* is, generally, associated with a different calibration data set, embodied in camera calibration data 106, for transforming image space localization data included in classified and localized lane curve data 132 to real world space. The image to real space transformer 106 is configured to output real space lane feature data 136 by calculating the associated real space to image space transformation.

In various embodiments, the classification and localization system 200 includes a fusion module 138 configured to fuse the real space lane feature data 136. The real space lane feature data 136 may include overlapping or redundant lane features, such as overlapping lane markings, as a result of overlapping fields of view of the cameras 140*a* to 140*n*. The fusion module 138 is configured to fuse such redundant lane features (e.g. using an averaging process or by removing one of the redundant lane features) to produce fused lane feature data 140. The fused lane feature data 140 includes classified lane features and localized curve data for each of the features arranged in real world space relative to the vehicle 10. The lane features have been classified and localized by running multiple images from multiple cameras 140*a* to 140*n* in parallel through one artificial neural network 118, saving on processing and hardware requirements. Further, post-processing to cluster and curve fit is performed on assembled data, which is disassembled and fused during transformation and fusion processes to produce a consolidated and coherent set of real-world localized and classified lane features as part of fused lane feature data 140.

In embodiments, driving system 202 is configured to use the fused lane feature data 140 to implement various automated driving features. For example, an automated lane centering system included in driving system 202 is configured to use lane boundary data included in fused lane feature data 140 to maintain vehicle 10 centered in the lane. In fully automated embodiments, the autonomous driving system 70 (see FIG. 3 and the foregoing description) is included in driving system 202 and uses various lane features in fused lane feature data 140 (including curb data, lane boundary data, stop lines, parking line data, etc.) to control vehicle 10 as it automatically traverses a path to a destination.

Figure 9:
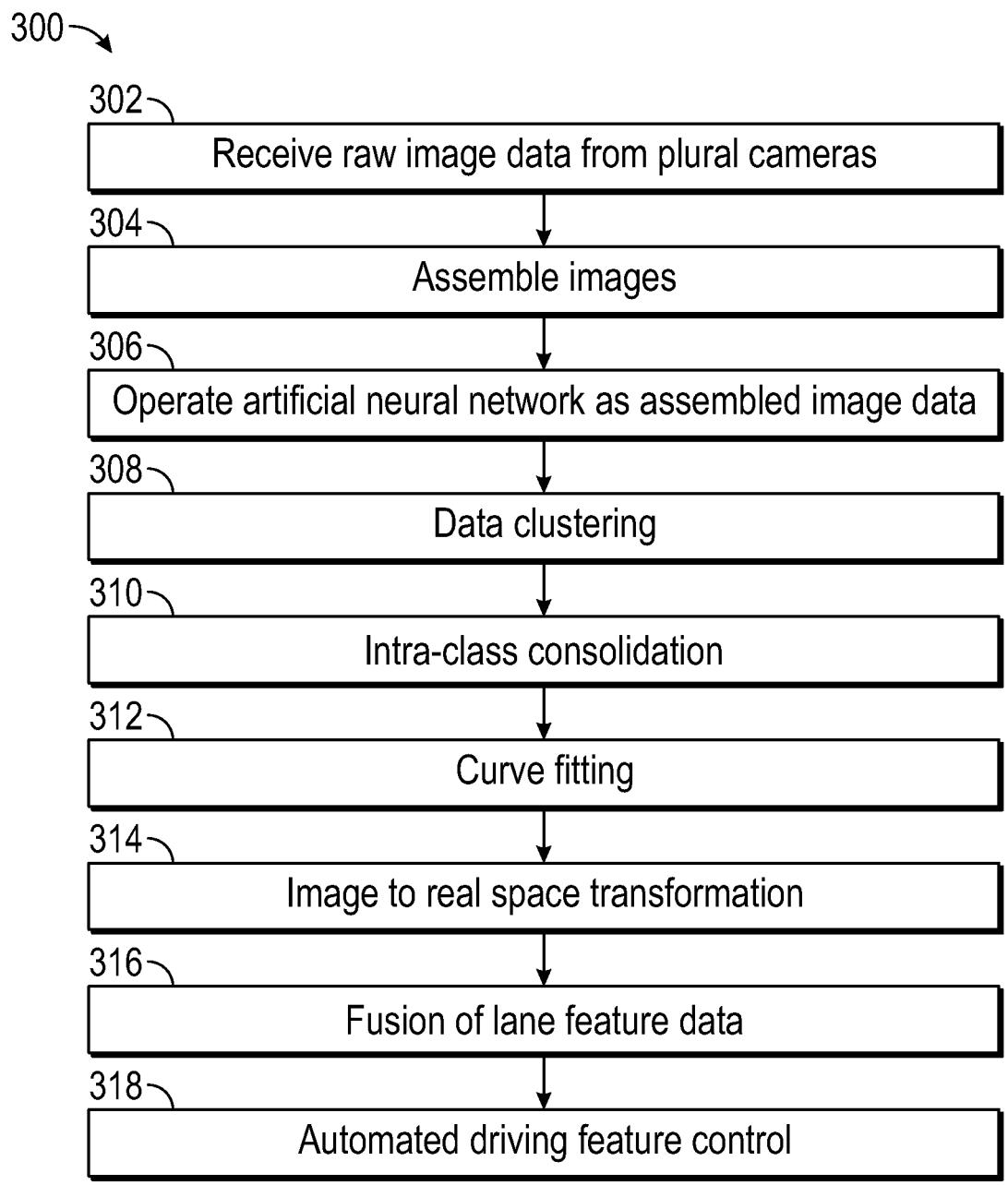
FIG. 9 is a flowchart illustrating a control method for controlling a vehicle including autonomous features, in accordance with various embodiments.

Referring now to FIG. 9, and with continued reference to FIGS. 1-8, a flowchart illustrates a control method 300 that can be performed by the classification and localization system 200 of FIG. 4 in accordance with the present disclosure. As can be appreciated in light of the disclosure, the order of operation within the method is not limited to the sequential execution as illustrated in FIG. 9, but may be performed in one or more varying orders as applicable and in accordance with the present disclosure. In various embodiments, the method 300 can be scheduled to run based on one or more predetermined events, and/or can run continuously during operation of the autonomous vehicle 10.

At 302, raw image data 102*a* to 102*n* from respective cameras 140*a* to 140*e* is received by the classification and localization system 200. In embodiments, the raw image data 102*a* to 102*n* is pre-processed, via pre-processor 104, based on camera specific calibration data 106, to remove distortion effects and other image artefacts.

At 304, the pre-processed image data 108*a* to 108*n* is assembled, via image assembler 110, to produce assembled image data 112. The image assembler 110 is configured to concatenate respective image arrays forming the pre-processed image data 108*a* to 108*n* into a single, assembled image array forming assembled image data 112.

At 306, the artificial neural network 118 is operated on the assembled image data 112 to classify and localize image features, specifically line based lane features. In various embodiments, the assembled image data 112 is directed to traverse convolutional layers 114 and pool layers 115. A feature map 121 produced by the convolutional and pool layers 114, 115 is run through both a detection network 117 for classifying various lane features and a regression network 119 for localizing lane features. The artificial neural network 118 thus produces classification parameters 370 and localization parameters 372, which are incorporated in output classified and localized data 120. The localization parameters 372 define a population of line segments, in embodiments. The feature map 121 is, generally, such that inner and outer boundaries of lane features of interest are produced and output as part of localization parameters 372.

At 308, data clustering is performed, via the data clusterer 122, on the classified and localized data 120, which includes placing anchor points 220 along each of the line segments. The anchor points 220 are clustered based on classification and proximity to provide clustered anchor points data 124. At 310, intra-class consolidation is performed, via intra-class consolidator 126, to group clusters of the same class that seem to belong to the same lane entity based on, for example, proximity and orientation of each cluster.

At 312, curve fitting is performed, via curve fitter 130, on consolidated and clustered anchor points data 128 provided from the data clusterer 122. Curve fitting calculates a curve 222 passing through the population of anchor points 220 existing for each consolidated and clustered lane entity provided in the consolidated and clustered anchor points data 128. In this way, classified and localized lane curve data 132 is provided that includes localized and classified lane entities each defining curves.

At 314, image space to real space transformation is performed, via image to real space transformer 134, on the classified and localized lane curve data 132 to localize each lane feature or lane entity relative to the vehicle 10. There may be some overlap of lane features in the resulting real space lane feature data 136, which is removed by performing fusion of lane feature data at step 316, via fusion module 138, thereby producing fused lane feature data 140.

At 318, automated driving feature control is executed, via driving system 202, based on lane features included in the fused lane feature data 140. The driving system 202 includes the autonomous driving system 70, in various embodiments.

Systems and methods described herein also allow for effective training of the artificial neural network 118 that has been described with respect to FIGS. 4 and 6, in accordance with various embodiments. Referring to FIG. 6, a system 350 for training the artificial neural network 118 is illustrated. The system 350 includes the artificial neural network 118 as hereinbefore described and an image augmenter 230. The system 350 is configured to receive label feature data 352 including inner and outer line labels 241*b*, 241*a* associated with each lane feature of interest.

In the example of FIG. 6, a labelled line extending along one edge of a curb serves as an inner labelled line 241*b* and a labelled line extending along another edge of the same curb serves as an outer labelled line 241*a*. Here "inner" and "outer" is used with reference to the camera 140*a* to 140*e* capturing the image, with "outer" being in a direction further away from the camera 140*a* to 140*e* than "inner". Each lane feature is labelled with inner and outer labelled lines to show not just a direction of extension and position of the labelled lane feature in the image, but also a thickness of the lane feature in the image. Since each labelled feature has a longitudinal direction of extension, inner and outer labelled lines are used to delimit longitudinal edges of the lane feature. In embodiments, the lines are labelled by a human operator of an image labelling system (not shown) and the feature label data 352 is extracted from the human labelled lines. Inner and outer longitudinal edges of each lane feature of interest are inserted in a population of images to form a labelled training set of images for the artificial neural network 118.

Further examples of labelled lane features are found in FIGS. 5(*a*), 5(*b*) and 7(*a*) to 7(*d*). FIG. 5(A) includes a curb 1 label including inner and outer labelled lines 247*b*, 247*a* for respective edges of curb 1. FIG. 5(A) includes labelled curb 2 including inner and outer labelled lines 248*b*, 248*a*, a double yellow line label including inner and outer labelled lines 249*b*, 249*a* corresponding to edges of the double yellow line and a labelled stop bar including inner and outer labelled lines 246*b*, 246*a* at respective edges of the stop bar. FIG. 5(B) includes inner and outer labelled lines 245*b*, 245*a* of a dashed white line. FIG. 7(A) includes inner and outer labelled lines 240*b*, 240*a* defining respective longitudinal edges (in the image) of a curb on one side of a road and inner and outer labelled lines 244*b*, 244*a* of a curb on an opposite side of the road. Also labelled in FIG. 7(A) is a double yellow line including inner and outer labeled lines 242*b*, 242*a* extending along respective longitudinal edges of the double yellow line.

Referring to the training system of FIG. 6, an image augmenter 230 is provided, in accordance with various embodiments. The image augmenter 230 includes processor and computer executable instructions for performing image transformations. As can be appreciated, accuracy and adaptability of the artificial neural network 118 is increased with greater numbers and variety of images in a labelled training set. The image augmenter 230 is configured to perform image transformations to produce multiple augmented feature label data 354 for use in training the artificial neural network 118. The image augmenter 230 operates on the feature label data 352 that has already been labelled by a human operative and extracts augmented feature labels based on the human labels from the transformed images. Various image transformation effects can be utilized including change of lighting effect, change of weather effect, image noise effects, change of focus effect, change of perspective effect, change of scale, change of aspect ratio, and white balance effects. In particular, weather simulation, change of perspective, simulated lighting changes and simulated shadowing are reflective of conditions faced by a run-time vehicle 10. Image transforms for producing such affects are available.

With reference to FIGS. 7(*a*) to 7(*d*), an example is provided of producing labelled images having different perspectives from a first image (FIG. 7(A)) 374 having a first perspective. In FIG. 7(B), a further forward located perspective is provided. In FIG. 7(C), a further forward and left-side perspective is provided. In FIG. 7(D) a further forward and right-side perspective is provided. At least one of the labelled image features from the first image In embodiments, the image augmenter 230 utilizes, inter alia, geometric transforms for producing augmented feature label data 354. Various geometric transforms are available including scaling, translation, rotation, perspective transformation, general affine transformation, etc.

In various embodiments, the feature label data 352 and the augmented feature label data 354 is utilized by the artificial neural network 118 as a training set of images for the artificial neural network 118. The artificial neural network 118 is configured to use the feature label data 352 and the augmented feature label data 354 as classification and localization learning targets for the detection and regression cost functions $C_1$, $C_2$ of the detection network 117 and the regression network 119, respectively. The classification and localization learning targets are defined in a learning target region 358 as shown schematically in FIG. 6. The learning target region 358 includes inner and outer margin regions 360*b*, 360*a* that are delimited by lines extending adjacent to inner and outer labelled lines 241*a*, 241*b* marked along inner and outer longitudinal edges of a labelled lane feature of interest (which is a curb in the example of FIG. 6). The inner and outer margin regions 360*a*, 360*b* provide an expanded target region, which is termed a region of interest elsewhere herein, on either side of the region defined between the inner and outer labelled lines 241*a*, 241*b*, thereby providing a generously proportioned learning target region 358 for the detection and regression cost functions $C_1$ and $C_2$, respectively. In this way, an efficient and more effective training process for the artificial neural network 118 is assured.

In embodiments, the training system 350 is configured to run computer-generated versions of the augmented feature label data 354 and the manually labelled feature label data 352 during the training process. The detection and regression networks 117, 119 of the artificial neural network 118 will respectively produce classification and localization parameters 370, 372 when the unlabeled image data 352' and the augmented unlabeled image data 354' are run through the artificial neural network 118. The detection and regression cost functions $C_1$, $C_2$ serve to measure, within the region of interest 358, a difference between the classification and localization parameters 370, 372 and the expected outputs defined in the augmented and labelled image feature data 352, 354 serving as the training data set. In the case of the regression network 119, the regression cost function $C_2$ measures a difference between output localization parameters and the corresponding labels in learning target region 358. In embodiments, training proceeds by minimizing the detection and regression cost functions $C_1$, $C_2$ and adjusting weights and biases of the various layers 114, 115, 116 of the artificial neural network 118 by calculating a gradient vector of the detection and regression cost functions $C_1$, $C_2$ (e.g. through backpropagation). In embodiments, false positives occur when the centers of cells 359 are not included within the extended region of interest 358, which will be indicated by a result of evaluating the cost function $C_2$, which will cause adjustment of weights and biases of one or more of the various layers 114, 115, 116 of the artificial neural network 118 to minimize the result of the cost function $C_2$.

Figure 10:
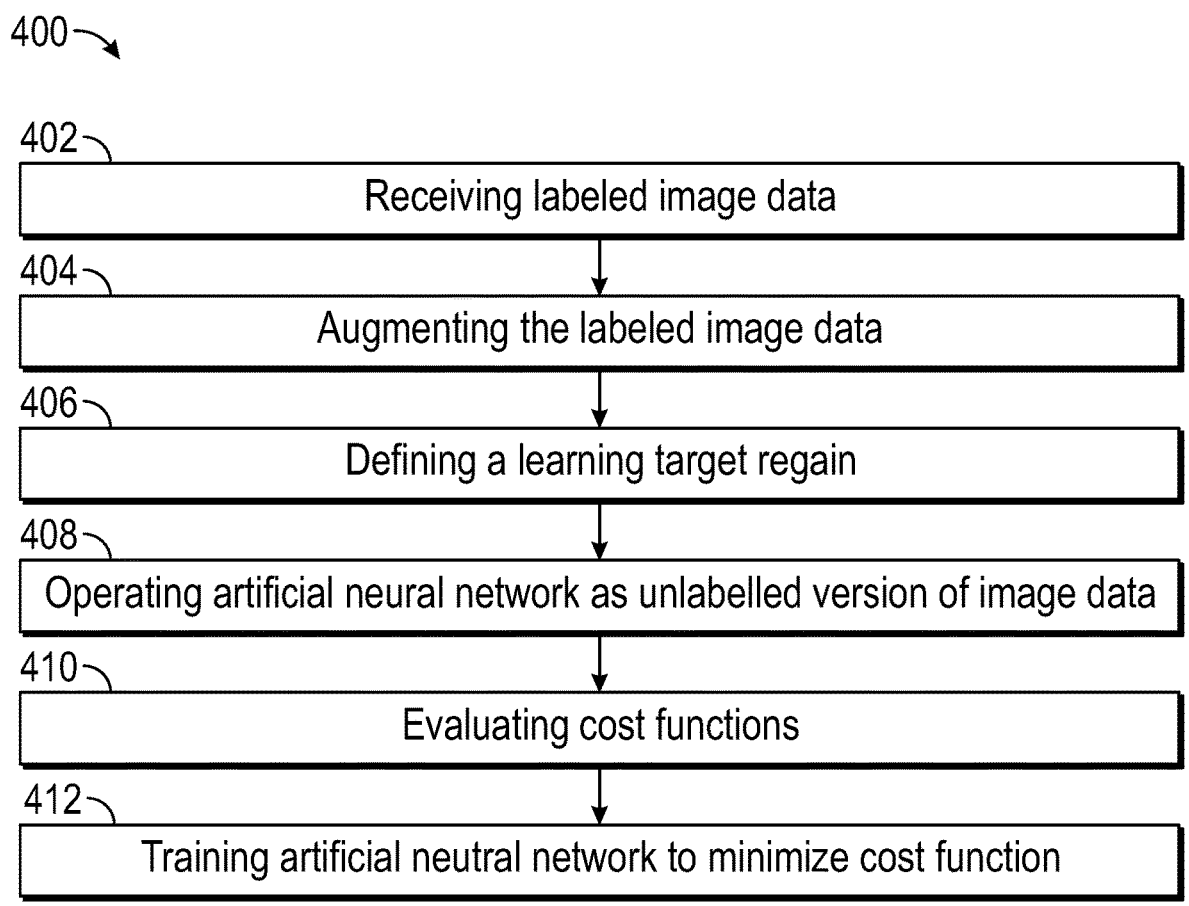
FIG. 10 is a flowchart illustrating a training method for an artificial neural network, in accordance with various embodiments.

Referring now to FIG. 10, and with continued reference to FIGS. 1-8, a flowchart illustrates a training method 400 for an artificial neural network 118 that can be performed by the training system 350 of FIG. 6, in accordance with the present disclosure. As can be appreciated in light of the disclosure, the order of operation within the method 400 is not limited to the sequential execution as illustrated in FIG. 10, but may be performed in one or more varying orders as applicable and in accordance with the present disclosure.

At 402, feature label data 352 is received by the training system 350. In embodiments, the feature label data 352 is derived from road images that have been labelled by a human labelling operative. Each lane feature of interest is classified and inner and outer line labels (e.g. 241*a*, 241*b*) extending longitudinally along each lane feature are included to localize the lane features of interest.

At 404, and in accordance with various embodiments, the feature label data 352 is processed, via the image augmenter 230, to produce augmented feature label data 354. Each of the images, from which feature label data 352 is derived, is multiplied by image augmenter 230 through different transformation effects. In various embodiments, the image augmenter 230 produces images having different perspectives, localized shadowing, lighting changes, focus changes, change of white balance, scale changes, aspect ratio changes, noise effects, etc.

At 406, a learning target region or region of interest 358 is defined by a processor of the training system 350. A longitudinal region is already included between inner and outer labelled lines 241*a*, 241*b* delimiting each feature of interest. This longitudinal region is expanded on both sides through inner and outer margin regions 360*a*, 360*b*. The margin regions 360*a*, 360*b* are determinable through a design parameter of the training system 350, in various embodiments. A domain of the cost functions $C_1$, $C_2$ is defined based on the region of interest 358.

At 408, the artificial neural network 118 is operated on unlabeled versions of the input image data 352 and augmented image data 354. The artificial neural network 118 output classification parameters 370 and localization parameters 372 from the detection network 117 and the regression network 119, respectively.

At 410, the detection and regression cost functions $C_1$, $C_2$ are evaluated for the detection network 117 and the regression network 119, respectively. The detection cost function $C_1$ determines an error between the output classification parameters 370 and the learning target classification parameters (nominal parameters within the region of interest 358) defined by the feature label data 352 and the augmented feature label data 354. The regression cost function $C_2$ determines an error between the output localization parameters 372 and nominal parameters (constrained by the region of interest 358) defined by the augmented feature label data 354 and the feature label data 352.

At 412, the artificial neural network is trained to minimize the result of evaluating the detection and regression cost functions $C_1$, $C_2$, e.g. minimize the error between the learning targets (nominal parameters within the region of interest 358) and the parameters 370, 372 output from the artificial neural network 118. Generally, the training process includes computing partial derivatives of the detection and regression cost functions $C_1$, $C_2$ and adjusting weights and biases of the layers of the artificial neural network 118.

Although the training system 350 and the associated training method has been described herein with respective to automotive applications, it should be understood that the disclosed systems and methods are applicable to training other artificial neural networks for localizing and classifying line-based features included in images.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method of controlling a vehicle, comprising:
   receiving, via at least one processor, image data from each of plural cameras mounted on the vehicle;
   assembling, via the at least one processor, the image data from each of the plural cameras to form assembled image data;
   classifying and localizing lane features using an artificial neural network based on the assembled image data, to produce classified and localized lane data;
   performing, via the at least one processor, a data fusion process based on the classified and localized lane data defining line segments, thereby producing fused lane feature data;
   defining, via the at least one processor, anchor points along each of the line segments;
   data clustering, via the at least one processor, the anchor points to produce clustered anchor points;
   curve fitting, via the at least one processor, the clustered anchor points to produce the classified and localized lane curve data; and
   controlling, via the at least one processor, the vehicle based, in part, on the fused lane feature data.

2. The method of claim 1, performing, via the at least one processor, an image space to real space transformation based on the classified and localized lane data to provide real space lane feature data.

3. The method of claim 2, wherein the transforming occurs before the fusing.

4. The method of claim 1, wherein a plurality of the cameras has a different, but overlapping field of view and the fusion comprises consolidating overlapping fields of view.

5. The method of claim 1, wherein the classified and localized lane data defines line segments.

6. The method of claim 1, comprising performing, via the at least one processor, an image space to real space transformation based on the classified and localized lane curve data to provide real space lane feature data and performing the data fusion process based on the real space lane feature data, thereby producing the fused lane feature data.

7. A system for localizing and classifying line-based image features, wherein the system comprises:
   at least one processor configured to:
      receive image data from each of plural cameras; and
      assemble the image data from each of the plural cameras to form assembled image data; and
   an artificial neural network configured to:
      classify and localize line-based image features based on the assembled image data to produce classified and localized line data defining line segments;
      wherein the at least one processor is configured to define anchor points along each of the line segments, to data cluster the anchor points and to curve fit the clustered anchor points to produce the classified and localized lane curve data;
      wherein the at least one processor is configured to perform a data fusion process based on the classified and localized line data, thereby producing fused line-based feature data.

8. The system of claim 7, wherein the artificial neural network is configured to classify and localize line based lane features.

9. The system of claim 7, wherein the system is a vehicle system and the processor is configured to control a vehicle based, in part, on the fused lane feature data.

10. The system of claim 7, wherein the at least one processor is configured to perform an image space to real space transformation based on the classified and localized lane curve data to provide real space lane feature data and to perform the data fusion process based on the real space lane feature data, thereby producing the fused lane feature data.

* * * * *